April 22, 1969     R. J. TOLMIE     3,440,464
ELECTROMAGNETIC APPARATUS
Filed Aug. 2, 1965     Sheet 1 of 2
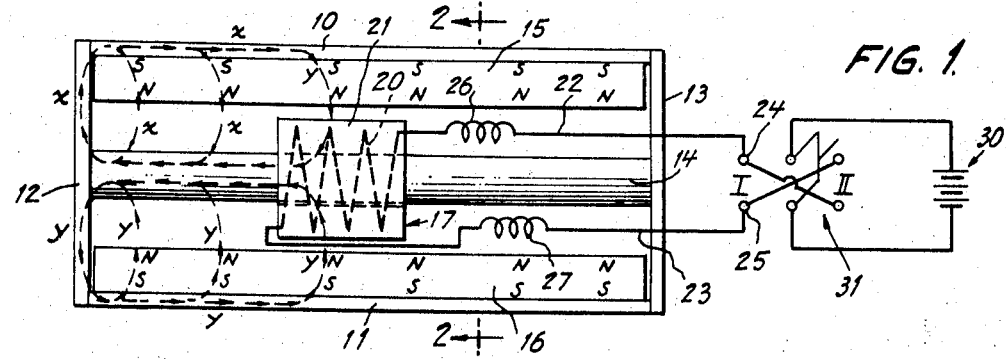
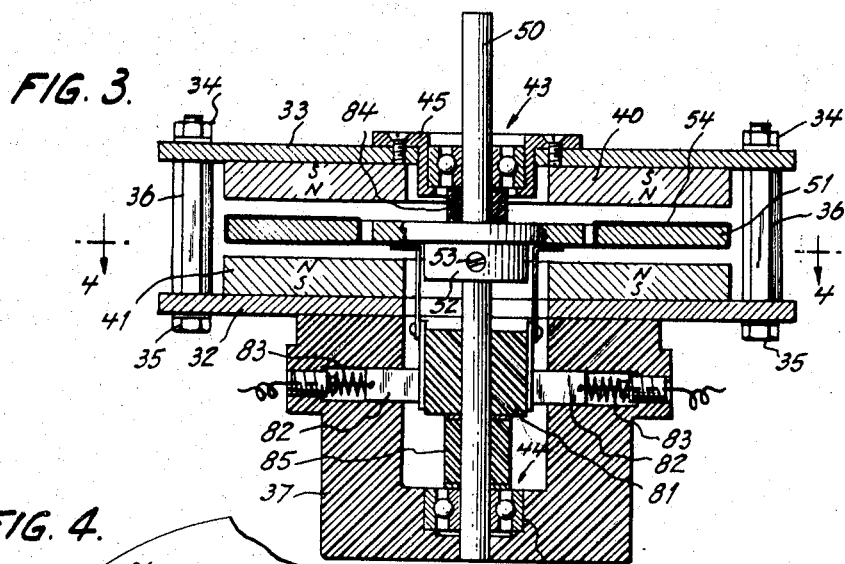
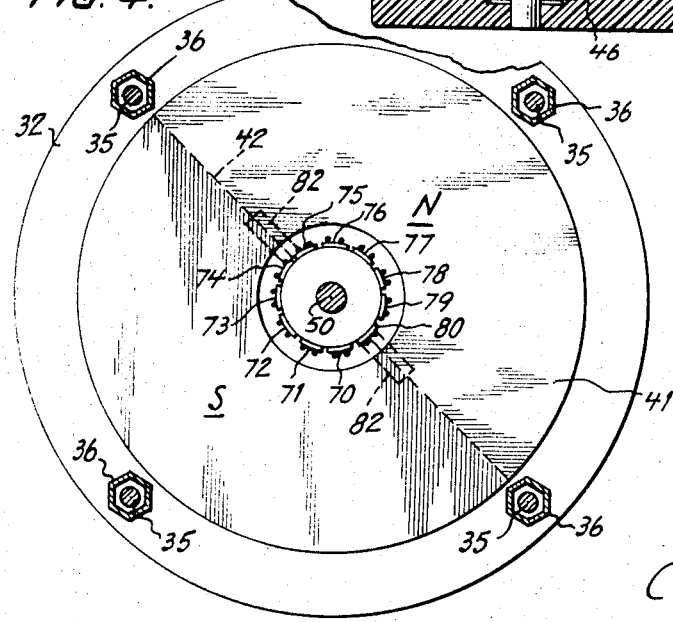
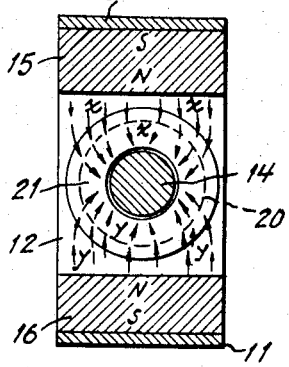
INVENTOR.
ROBERT J. TOLMIE
BY
*C. M. Miranda*
ATTORNEY INVENTOR.
ROBERT J. TOLMIE
BY
C. M. Miranda
ATTORNEY

United States Patent Office 3,440,464
Patented Apr. 22, 1969

3,440,464
ELECTROMAGNETIC APPARATUS
Robert J. Tolmie, Fairfield, Conn., assignor to Sperry Rand Corporation, New York, N.Y., a corporation of Delaware
Filed Aug. 2, 1965, Ser. No. 476,472
Int. Cl. H02k 21/30
U.S. Cl. 310—154         11 Claims

ABSTRACT OF THE DISCLOSURE

An electric motor wherein linear or rotary motion is imparted to an armature by an interacting magnetic field and which magnetic field includes spaced and parallel permanent magnets defining an air gap therebetween within which is disposed the armature with the confronting pole faces of the spaced magnets being of like polarity to impart a force on the armature parallel to the magnet faces.

---

The present invention relates in general to electromagnetic apparatus and more particularly to electric motors.

The recent rapid growth of battery operated products in the appliance industry has brought about intensified engineering efforts to provide improved products having features that appeal to the consumer. It is common for battery operated appliances to use relatively expensive rechargeable batteries for energization of a small motor, therefore, the efficiency of the motor is a major consideration in determining the overall appliance acceptability. Motors designed for such purposes are in many instances quite inefficient, and furthermore they are relatively expensive due to the stringent tolerance requirements commonly imposed when dealing with miniature electrical components. Moreover, the wide variation of specifications between such appliances has hampered attempts to design an efficient low-cost motor capable of versatile application.

It is, therefore, an object of the present invention to provide novel electromagnetic apparatus of reliable, simple and economical design, capable of versatile application.

Another object is to provide an efficient electric motor of simple design wherein the force exerted on the armature is substantially constant throughout operation.

A further object is to provide electromagnetic apparatus in which linear motion is imparted to an armature by virtue of interacting magnetic fields produced by elements arranged in a novel manner.

Still another object is to provide electromagnetic apparatus in which rotary motion is imparted to an armature by virtue of interacting magnetic fields produced by elements arranged in a novel manner.

A still further object is to provide electromagnetic apparatus in which energy is imparted to move an element to a position corresponding to a selected input.

Yet another object is to provide electromagnetic apparatus in which interacting magnetic fields are employed in a novel manner to impart relative motion between the elements.

The epresent invention is directed to a novel electromagnetic machine in which an armature assembly mounted in a magnetic field is caused to move relative to a frame assembly by virtue of interaction between magnetic fluxes produced by field producing elements on the frame assembly and by a coil assembly mounted on the armature. According to one embodiment, the invention contemplates the provision of an electric motor comprising a stator assembly including two permanently magnetized ring members mounted in spaced coaxial relationship, each of which ring members is axially polarized and has face portions consisting of two oppositely polarized regions of substantially identical shape. The ring members are mounted such that the polarized regions on the confronting face portion of one ring confront like polarized regions on the other ring to define an air gap therebetween. A rotor assembly, including a shaft, a magnetically conducting armature and a toroidal coil, is mounted in the air gap for rotation about an axis coincident with the disc axes. The rotor assembly more specifically comprises an armature, which is substantially ring-shaped and mounted centrally between the ring members and concentric to the shaft, for providing a magnetically conductive core about which the toroidal coil is symmetrically wound. By mounting the armature in this manner a path is provided through which the fluxes in the air gap may be conducted. For the purposes of this discription the air gap can be said to be divided in halves by the armature in one sense, and by a plane defined by the axis and the boundary dividing the identical polarized halves of the permanently magnetized ring members in another sense. Thus, since the opposing polar regions are of like polarity, the direction of the flux in a first axial half of the air gap is opposite to the direction of the flux in the other half of the air gap axially opposite thereof, and further, due to the symmetrical division of the magnetized members, the fluxes in the air gap diametrically opposite each other are also in axially opposite directions.

The toroidal coil comprises a plurality of like coil sectors each having a predetermined number of windings wound in the same direction and each having leads at both ends. The leads are connected to commutator segments mounted on the shaft, which segments are equal in number to the number of coil sectors. More specifically, the leads from adjacent ends of coil sectors are connected in pairs to a corresponding segment. A source of power is provided to energize the toroidal coil with unidirectional current introduced through the commutator segments via appropriate brushes. By mounting a pair of brushes in diametric opposition the coil current conduction from one brush to the other is in the nature of two equal branches of a parallel circuit, i.e., each branch comprises a circuit from one brush through the segment contiguous therewith, to the coil sectors connected in series through the appropriate segments, and then to the other brush. The coil can be said to be electrically divided into two equal halves inasmuch as there is always current flowing in opposite directions in the two equal branches regardless of the position of the rotor, therefore, by positioning the brushes in correspondence with the boundary between the magnetized regions of the disc members, the coil halves are always completely disposed between pole face regions of like polarity.

By virtue of the above-explained novel arrangement of elements, a force is imparted for rotating the rotor assembly, which is mounted in conventional bearing members affixed to the frame. The unidirectional current flowing in the coil halves provides in effect two oppositely polarized semicircular solenoids and the flux field from these coils interacts with the flux fields produced by the permanently magnetized ring members to exert simultaneous forces in a common rotational direction on all the windings. For example, considering one particular winding, which is (as are all the windings) disposed symmetrically on the armature, the flux from the adjacent magnet pole radially intersects half the winding in one axial direction while the flux from the opposite magnet (like polarity) radially intersects the remaining half of the particular winding in an axially opposite direction. This results in forces in the same direction on both halves of the winding and the net effect is a total rotational force in the same direction on all coil windings disposed between the particular pair of magnet poles. Likewise, force in a common direction is imparted to both coil halves due to the oppositely polarized identical regions which, by virtue of the commutator arrangement, are always disposed adjacent a coil half which is polarized opposite to the other coil half.

The foregoing and other objects, features and advantages of the invention will appear more fully hereinafter from a consideration of the detailed description which follows, considered in conjunction with the accompanying drawings wherein several embodiments of the invention are illustrated by way of example. It is to be expressly understood, however, that the drawings are for illustrative purposes only and are not to be construed as defining the limits of the invention.

In the drawings, wherein like reference characters refer to like parts throughout the several views;

FIG. 1 is an elevation of one embodiment of the invention;

FIG. 2 is a sectional view taken along line 2—2 of FIG. 1;

FIG. 3 is a sectional view of a second embodiment of the invention;

FIG. 4 is a sectional view taken along line 4—4 of FIG. 3;

Figure 6:
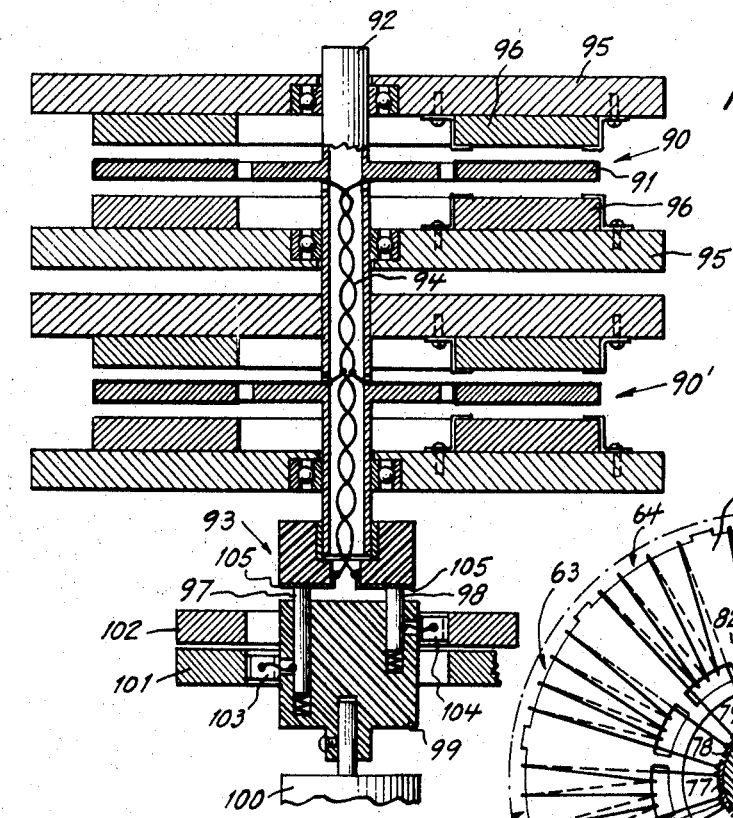
FIG. 6 is a sectional view of a modified embodiment of the invention.

Referring to the drawings and particularly in FIG. 1, an embodiment of subject invention is shown wherein electrical energy is converted from a D.C. power source, such as an electric battery, to mechanical energy, whereby bidirectional linear motion is imparted to an armature member. The FIG. 1 embodiment is directed to an electric motor of the linear type comprising, a soft iron rectangular stator frame having two longitudinally extending members 10 and 11, secured to two rectangular vertical frame members 12 and 13, a rod 14 mounted longitudinally between the midpoints of vertical frame members 12 and 13 (see FIG. 2). An upper bar magnet 15 and a lower bar magnet 16 of ceramic material are magnetized in regions as indicated by the symbols S and N, which symbols are used throughout to designate magnetic polarization in the conventional manner. Magnets 15 and 16 are affixed magnetically to oppositely disposed, longitudinal frame members 12 and 13 in position to magnetically oppose each other, i.e., each polarized region on upper bar magnet 15 confronts a like polarized region on lower bar magnet 16. It should be noted that the most simple and economical method is shown for affixing the magnets to the stator frame; however, screws or any other method of securement may be employed. A series of arrows $x$, $y$ are shown in FIGS. 1 and 2 to illustrate the configuration of the magnetic field established by the polarized regions of bar magnets 15 and 16. The arrows shown are merely exemplary and are not intended to show all the various paths of flux which are obvious in light of those shown. Thus, the magnetic circuit for the flux originating at the magnets includes, the air gaps between rod 14 and magnets, the rod 14, the vertical frame members 12 and 13, and the horizontal frame members 10 and 11.

An electric coil assembly 17 comprising helical coil 20 potted in a non-conducting tubular casing member 21, and having flexible leads 22 and 23 terminated at terminals 24 and 25, is disposed concentrically for sliding engagement with rod 14. The leads 22 and 23 are provided with coiled sections 26 and 27, respectively, which deform in accordance with the position at which the coil assembly 17 is disposed with respect to rod 14 and thus afford freedom of movement thereto. Many alternative methods are conceivable by which connections to the coil may be made whereby the moving coil is energized without physically obstructing its path. For example, another arrangement (not shown) found to be satisfactory includes two electrical brushes mounted on the coil assembly and maintained in sliding contact with corresponding continuous, stationary contact strips insulatedly embedded in rod 14 along its entire length. Coil 20 is selectively energized by a battery 30 by means of a double pole, double throw switch 31, having operative positions referred to hereinafter by Roman numerals I and II.

Other alternative configurations (not shown) of the above-described device, that are within the general scope of the invention, include modification of permanent magnet members 15 and 16 such that their confronting faces are concave shaped, or modification of casing member 21, coil 20, and rod 14 such that they are of complimenting rectangular configuration.

The embodiments shown in FIGS. 1 and 2 operate in the following manner, which operation is set forth as an illustration of the basic interrelation of elements throughout the several embodiments, inasmuch as the interaction of flux fields is concerned. When switch 31 is moved to position I, current traverses coil 20 in a first certain direction effectively resulting in a solenoid (coil assembly 17) having a magnetic flux field polarized in accordance with such certain direction. Likewise, when switch 31 is moved to position II, current traverses coil 20 in the opposite direction effectively resulting in the solenoid having polarity opposite to that present when the switch is in position I. The solenoid's flux field interacts with the flux fields (illustrated by arrows $x$, $y$ in FIGS. 1 and 2) of magnets 15 and 16 in a manner such that the forces exerted on the coil 20 tend to translate the coil assembly 17 along stator rod 14 in a direction determined by the solenoid polarity. To this end, rod 14 serves as a common magnetic return path for the fluxes of upper magnet 15 and lower magnet 16, and the flux from each magnet, in traveling to rod 14 across the adjacent intervening air gap therebetween (as described above), radially intersects a particular half of the windings of coil 20. For example, the flux from upper magnet 15 radially intersects the upper half of the coil, as illustrated by the upper group of arrows $x$ in FIG. 2. Simultaneously, the remaining half of the coil windings are radically intersected by flux originating in lower magnet 16. Therefore, the net effect results in the fluxes of magnets 15 and 16 interacting with the flux field of the solenoid to exert simultaneous forces in the same longitudinal direction on both halves of the coil 20. By reversing the solenoid polarity, the direction of the forces is also reversed, which reversal is effected by changing the switch 31 from one position to the other, as explained hereinabove, thus, it is readily apparent that a bidirectional linear movement is imparted which may be effectively utilized to perform useful work. It should be noted that the switching arrangement is shown in simplified schematic form for illustrative purposes and that, depending on the particular adaptation of the mechanism, many arrangements are possible. For example, electrical contacts (not shown) may be positioned at the opposite ends of the stator frame in position for actuation responsive to the impact of casing member 21 thereagainst at the end of each of its strokes to automatically reverse the solenoid polarity.

Figure 5:
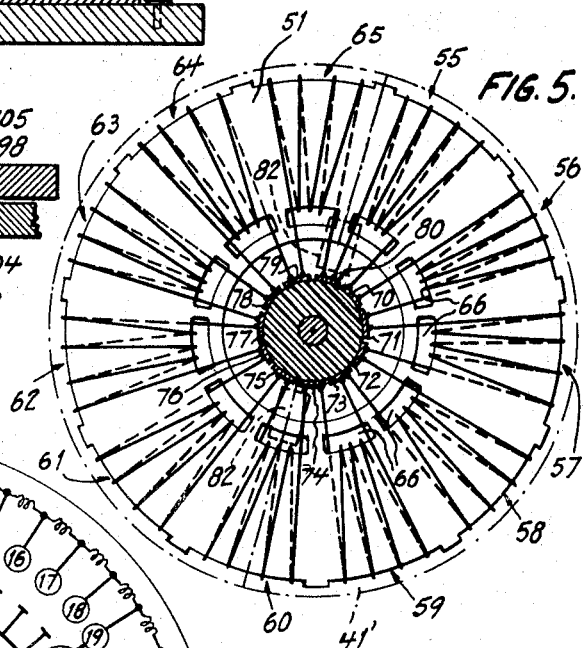
FIG. 5 is a schematic plan view of the rotor and a portion of the stator utilized in the second embodiment of the invention as shown in FIGS. 3 and 4.

FIG. 3 shows a sectional view of a second embodiment of the invention, wherein a rotational motion is imparted, in contradistinction to the linear motion of the first embodiment explained hereinabove. In the second embodiment the stator assembly includes, circular end plates 32 and 33 (of magnetic material) secured in spaced coaxial relationship by nuts 34, bolts 35, and intermediate collar members 36 (see FIG. 4), and a nonconductive commutator housing 37. A ring-shaped upper magnet 40 is magnetically affixed to end plate 33 in coaxial relationship, and lower ring-shaped magnet 41 is magnetically affixed to end plate 32 in coaxial relationship. (As in the first embodiment the securing means is not limited to that shown.) Each ring-shaped magnet is axially polarized (as illustrated in FIG. 3) and has face portions consisting of two oppositely polarized regions of substantially identical shape, as shown in FIG. 4 with respect to lower magnet 41. As in the first embodiment, confronting pole faces are necessarily of the same polarity, and to this end the magnets are mounted such that the polarized regions on the face portion of one magnet confront like polarized regions on the other magnet to define an air gap therebetween, as shown by the designated poles in the FIG. 3 embodiment. It should be noted that line 42 (FIG. 4) indicates an imaginary boundary separating oppositely polarized regions, which line obviously extends in the same radial direction on the upper and lower magnets. The stator assembly further includes ball bearing and race assemblies 43 and 44, the former of which is secured to end plate 33 by a seating member 45, and the latter of which is seated in a recessed portion 46 of housing 37. Mounted for rotation in the bearing assemblies 43 and 44 is a rotor assembly, comprising a shaft 50 having a ring-shaped armature 51 (also see FIG. 5 for a plan view of armature 51) affixed thereto by means a collar member 52 keyed to the shaft by a set screw 53. A toroidal coil 54 is wound on armature 51 in the manner illustrated in FIG. 5. Also shown in FIG. 5 is a phantom outline of a slightly enlarged adjacent ring-shaped magnet 41' to show the general relationship therewith, as discussed in further detail below. The toroidal coil includes eleven identical sectors, designated by reference numerals 55 thru 65, which sectors each comprise a like number of windings wound in the same direction through appropriate slots 66 provided therefor. The four windings to each sector shown in FIG. 5 is selected for simplification and it should be understood that the number of windings (which is determined by various factors, such as wire size, motor application, current magnitude, etc.) is usually much greater.

The ends of the coil sectors are attached to the eleven segments 70 thru 80, of a conventional commutator in the following manner. One end of sector 55 is connected to segment 70, and the adjacent end of sector 56 is also connected to segment 70. Likewise, the other end of sector 56 is connected to segment 71, as is the adjacent end of sector 57, and so on around the entire coil as shown in FIG. 5. Referring now to FIG. 3, it should be noted that the commutator segments are mounted on tubular mounting member 81 affixed to shaft 50, and are disposed to make contact with two brushes 82, biased thereagainst by springs 83. FIG. 4 shows the relative disposition of brushes 82 with respect to the polarized regions of lower magnet 41, i.e., in axial alignment with the line 42 which defines the boundary between the oppositely polarized regions. The above-mentioned confronting relationship of upper magnet 40 also provides the same relative disposition between the upper magnet pole boundary line (not shown) and the brushes.

The axial position of the armature is accurately maintained in the middle of the gap between the confronting pole faces by spacer rings 84 and 85.

The basic operation of the second embodiment, shown in FIGS. 3 thru 5, is somewhat apparent, in view of the above-described operation of the first embodiment, inasmuch as the interacting fluxes are concerned. Thus, where similarities occur the two embodiments are compared in the following operational description. The second embodiment (as well as the first embodiment), employs permanent magnets for establishing a magnetic field in an air gap in which a coil supporting armature is disposed. Unidirectional current traverses the coil windings in a manner whereby the coil flux and the magnets' fluxes interact to provide a rotational force exerted on the rotor armature. More specifically, when a D.C. source, such as a battery, is connected to brushes 82 (see phantom outline in FIG. 5) current simultaneously traverses the toroidal coil in two equal parallel paths comprising, in one instance, sectors 55, 56, 57, 58, and 59, and segments 80, 70, 71, 72, 73, and 74 and in the other instance, sectors 65, 64, 63, 62, and 61 and segments 80, 79, 78, 77, 76 and 75. Thus, sectors 55 thru 59 are combined to provide a first semicircular solenoid having a magnetic field polarized in accordance with the direction of current applied, and sectors 61 thru 65 are combined to provide a second semicircular solenoid having a magnetic field polarized in a direction opposite that of the first semicircular solenoid. It should be noted that sector 60 is shorted out and thus ineffective when the rotor is in the position shown. In the second embodiment, two solenoids are provided, as opposed to the sole solenoid of the first embodiment; however, each of the solenoids are oppositely polarized and disposed in a gap in which the flux fields are in opposite directions, therefore, in the second embodiment, as in the first embodiment, the solenoid field (of each half) interacts with flux field of the magnets to impart a force tending to translate the solenoid in a direction parallel to the magnet faces. Each semicircular solenoid is urged in the same direction by virtue of the oppositely polarized fields which correspond (in angular degrees) to each of them, i.e., if the polarization of the left half of the magnet (shown in phantom in FIG. 5) is such that the force exerted on sectors 55 thru 59 rotates the armature in a clockwise direction, then the oppositely polarized right half of the magnet will exert a force in the same direction on sectors 61 thru 65, which sectors are polarized oppositely to the five mentioned above.

The polarity of each sector is reversed when the corresponding segments pass the brushes and by such reversal, each semicircular solenoid maintains an equal number of toroidal sectors in the same relative position with respect to the stationary elements, and thus an even torque is applied to shaft 50.

Although the ring magnets referred to throughout this description have the polar configuration shown in FIG. 4, i.e., equal 180° polarized regions, it should be pointed out that without departing from the scope of the invention any even number of polarized regions may be employed with an equal number of commutator brushes corresponding thereto, e.g., four brushes and four equal 90° polarized regions.

Subject mechanism is suitable for application in many related devices other than the above described motors. For example, the modified embodiment in FIG. 6 shows a device having elements similar to the second embodiment in which the coil is stationary and the permanent magnets are mounted for rotation. This embodiment further shows the use of two units on a common axis. Referring to the drawing at FIG. 6, a first unit 90 comprises, a stator including a toroidal coil assembly 91, mounted on a shaft 92 and connected sequentially through diametrically opposed sector terminals to corresponding segments of a commutator 93 via wires 94 (only two shown), and a rotor including opposing plates 95 with ring-shaped permanent magnets 96 affixed thereto in confronting relation as described above with respect to the second embodiment. The second unit 90' is identical to the first unit and includes a like number of terminals connected in parallel to the commutator through wires 94. Brushes 97 and 98 are mounted in a mounting block 99, which is rotatably driven by a synchronous motor 100. A source (not shown) is connected across conductive rings 101 and 102 to provide current via sliding contact members 103 and 104, respectively, through the brushes 97 and 98, respectively, to the appropriate coil sectors in accordance with commutator segments 105 arranged to correspond to the various coil sectors in the same manner as described above with respect to the second embodiments. Included among the features of such a device is the ability to transfer and amplify a small rotational motion of synchronous motor 100 to drive large motors such as units 90 and 90'. Further, the remoteness of the connection of the commutator with respect to the armature may be utilized in many situations, for example, in water pumps, or in apparatus where frequent access for cleaning is necessary.

Figure 7:
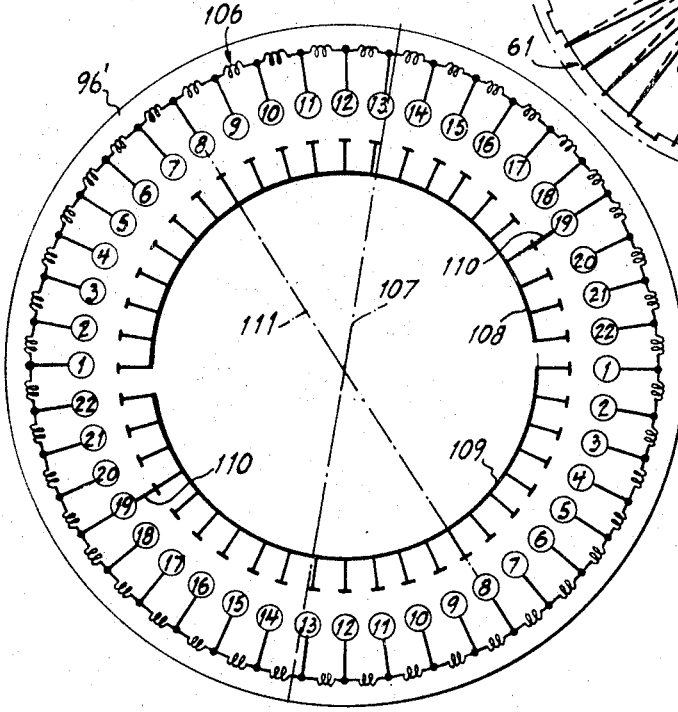
FIG. 7 is a schematic illustration of a positioning device in which the invention is employed.

The embodiment schematically illustrated by FIG. 7 shows a further application of subject mechanism wherein a positioning device utilizes a relatively movable permanent magnet 96' (as in the FIG. 6 embodiment) and a stationary toroidal coil 106 having a series of terminals connected thereto, intermediate adjacent sectors. Each terminal pair is disposed in diametric opposition and corresponds to a particular position that the magnet assembly will seek when the coil is energized therethrough. For example, if the magnet assembly is disposed in a relative position illustrated by a boundary line 107 and then a source, which is connected across contact strips 108 and 109, is switched across terminal pair 19 (as illustrated by contact bars 110) the magnet assembly will rotate to a null position illustrated by a boundary line 111. This null-seeking operation is an obvious offshoot of the above-described interacting field type motor apparatus.

In addition to the implied and explicit advantages set forth throughout the above description, it is obvious that subject mechanism lends itself to economical construction and efficient operation. Further, it applies substantially a constant force throughout operation and is versatile and adaptible to wide application as illustrated by the several embodiments described hereinabove.

Although specific embodiments of the invention have been illustrated and described in detail by way of example, it should be understood that the invention is not limited thereto. Various changes may be made in the design and in the arrangement of parts without departing from the spirit and scope of the invention as defined by the appended claims as will now be understood by those skilled in the art.

What is claimed is:
1. An electromagnetic machine comprising:
 (a) a pair of first and second magnetic field producing means each including a planar surface with predetermined polarization;
 (b) means for mounting said magnetic field producing means in spaced and parallel planes adjacent and opposing each other to define an air gap between said planar surfaces, and with the surface of said first magnetic field means having the same polarity as the corresponding opposing surface of said second means;
 (c) an electric coil;
 (d) a unidirectional power source for energizing said coil; and
 (e) means for mounting said coil in said air gap for motion, when said coil is energized, relative to said magnetic field producing means along a path substantially in the center of said opposing surfaces;
 (f) said confronting like magnetic field producing means imparting forces on said coil parallel to said planar surfaces for moving said coil in said air gap.

2. An electric motor comprising:
 (a) a stator frame assembly;
 (b) first and second permanent magnets each having first and second pole faces of opposite polarities;
 (c) means for mounting said magnets in spaced and parallel relationship on said stator frame with said first pole faces of opposing magnets defining an air gap therebetween and said second pole faces spaced from said air gap by said first pole faces;
 (d) a magnetic rod affixed to said frame for disposition midway in said air gap to provide a path for the fluxes of the magnets;
 (e) an electric coil slidably disposed on said rod with a portion of each coil winding disposed in the flux field of the first magnet and the remaining portion of each coil winding disposed in the flux field of the second magnet whereby parallel forces are imparted to said portions by said confronting magnets;
 (f) a power source for providing unidirectional current; and
 (g) means for connecting said power source to said electric coil to selectively energize said coil to first and second oppositely polarized conditions to cause said coil to be selectively driven in opposite directions in a linear path longitudinally along said rod as a result of the simultaneous forces exerted on the coil portions by the said interaction of the respective flux fields of said first and second magnets, and the flux field of the coil, said forces reversing in direction when said coil polarization reverses in accordance with the selected condition of said connecting means.

3. An electric motor comprising:
 (a) a stator frame assembly;
 (b) first and second permanent magnets having first and a second pole faces of opposite polarities;
 (c) means for mounting said magnets in confronting relationship on said stator frame with said first pole faces of said magnets of one polarity defining an air gap therebetween and with said second pole faces of the other polarity spaced from said air gap by said first pole faces;
 (d) a magnetic rod affixed to said frame for disposition midway in said air gap to provide a path for the fluxes of the magnets;
 (e) an electric coil assembly having windings on a core coaxially mounted for sliding engagement on said rod;
 (f) a power source for providing unidirectional current; and
 (g) switch means having first and second operative positions for connecting said power source to said windings to selectively energize said coil assembly respectively to first and second oppositely polarized conditions, said switch means in said first position operable to cause said coil assembly to be driven longitudinally along said rod in one direction as a result of the simultaneous parallel forces exerted on the coil assembly by the interaction of the respective flux fields of said like confronting faces of said first and second magnets, and the flux field of the coil assembly, said switch means in said second position operable to cause said second polarized condition to move said coil in an opposite direction;
 (h) said switch means operatively associated with said coil assembly and including an actuator arm for effecting said first and second positions in response to the disposition of said coil assembly with respect to said rod.

4. An electric motor comprising:
 (a) a stator assembly including, two longitudinally extending magnetic frame members, first and second elongated permanent magnets respectively affixed magnetically to said frame members and having first and second pole faces with like pole faces confronting each other and defining an air gap and with said second pole faces disposed against said frame and spaced from said air gap by said first pole faces and a magnetic rod member affixed to said frame and extending between said like poles for providing an equivalent flux path for the fluxes of both magnets;
 (b) an electric coil slidably disposed on said rod with half of each coil winding in the flux field of the first magnet and the other half of each coil winding in the flux field of the second magnet whereby parallel forces are imparted to said coil winding halves;

(c) a power source for providing unidirectional current; and
(d) means for connecting said power source to said electric coil to selectively energize said coil to first and second oppositely polarized conditions to cause said coil to be driven longitudinally along said rod as a result of the simultaneous forces exerted on the coil halves by the interaction of the respective flux fields of said first and second magnets, and the flux field of the coil, said forces reversing in direction when said coil polarization is reversed.

5. An electrical motor comprising:
(a) a stator assembly including, two longitudinally extending magnetic frame members, a pair of elongated permanent magnets having first and second pole faces of opposite polarities respectively affixed magnetically to said frame members with like poles confronting each other and defining an air gap therebetween and with said second pole faces spaced from said air gap by said flux pole faces, and a magnetic rod secured to said frame members and extending between said like poles for providing an equivalent parallel flux path for the parallel fluxes of both magnets;
(b) an electric coil assembly having windings on a core which is coaxially mounted for sliding engagement on said rod;
(c) a power source for providing unidirectional current; and
(d) switch means having first and second operative positions for connecting said power source to said coil windings to provide first and second oppositely polarized conditions of the coil assembly to effectively determine the direction of force exerted on the coil by the interaction of the flux field of said coil and the flux fields of the permanent magnets;
(e) said power source providing unidirectional current at a sufficient magnitude to energize said coil to the extent required to impart motion thereto;
(f) said first pair of contacts operatively associated with said electric coil assembly and adapted to automatically connected said power source to provide said first coil polarity when said coil assembly is driven to one end of said rod, said first polarity causing a force directed away from said one end;
(g) said second pair of contacts operatively associated with said coil assembly and adapted to automatically connect said power source to provide said second coil polarity when said coil assembly is driven to the other end of said rod, said second polarity causing a force directed away from said other end.

6. An electric motor comprising:
(a) first and second magnetic end plates retained in spaced and parallel relationship;
(b) first and second magnetic flux producing means affixed respectively to said first and second end plates in confronting relationship to define an air gap, said first and second flux producing means each including a planar surface having a plurality of alternately polarized regions disposed in opposition to a like region of the confronting flux producing means;
(c) a shaft rotatably mounted between said end plates and having an axis of rotation perpendicular to said planar surfaces;
(d) a magnetic armature mounted on said shaft for rotation therewith, and which armature is centrally disposed in said air gap;
(e) a plurality of coils mounted on said armature equidistant from said shaft; and
(f) means for energizing said coils to provide a net coil flux that interacts with the parallel force fields produced by said like polarized regions of said flux producing means to impart relative motion to said magnetic armature with respect to said end plates.

7. An electric motor comprising:
(a) a stator assembly including first and second circular magnetic end plates retained in parallel spaced relationship, and first and second permanently magnetized members magnetically affixed to the facing surfaces of said first and second end plates respectively, said permanently magnetized members having mutually parallel polar surfaces each of which have a plurality of pairs of like polarized regions confronting each other to define an air gap between said magnets;
(b) bearing means affixed to said end plates;
(c) a rotor assembly including a shaft rotatably mounted in said bearing means for rotation about an axis perpendicular to said parallel polar surfaces, a magnetic ring shaped armature mounted in the air gap and on said shaft for coaxial rotation therewith, and a plurality of electric coils circumferentially arranged on said armature;
(d) a power source for providing unidirectional current;
(e) commutator means associated with said shaft for connecting said power source to said coils to provide substantially all of the coil windings with unidirectional current in a direction that provides flux that interacts with flux from the permanently magnetized members to impart a force for rotatably driving said rotor assembly;
(f) said line opposing pole faces imparting forces to said armature parallel to each other and said end plates.

8. An electric motor comprising:
(a) first and second permanently magnetized ring members each having two symmetrical polarized regions on opposing face portions thereof;
(b) means for mounting said first and second ring members in spaced coaxial relationships with like polarized regions arranged face to face;
(c) a magnetic ring-shaped armature, having a diameter substantially the same as the diameter of said ring members;
(d) means for rotatably mounting said armature midway between said ring members for providing similar magnetic fields between said rings and said armature, and having an axis of rotation coincident with the ring axes;
(e) a toroidal coil symmetrically mounted on said armature with respect to said axis of rotation;
(f) said coil comprising a plurality of coil sectors;
(g) a power source for providing unidirectional current at a predetermined magnitude; and
(h) a commutator for connecting said power source to said coil, said commutator including a plurality of segments each connected to the end windings of two adjacent coil sectors, and a pair of brushes arranged in diametric opposition with respect to said axis of rotation for contact with said segments, whereby unidirectional current flows through said coil windings in opposite directions from a segment in contact with one brush to a segment in contact with the other brush, said current flow providing coil fluxes which interact with said similar magnetic fields to impart rotational motion to said armature.

9. An electric motor as set forth in claim 8 wherein said pair of brushes are mounted on said means for mounting said ring members in a position adjacent the boundary between the symmetrical polarized regions of said ring members and in the plane defined by the axis of rotation and said boundary.

10. A motion transferring electromagnetic device comprising:
(a) a stationary shaft;
(b) at least one magnetic ring mounted coaxially on said shaft;
(c) a toroidal coil symmetrically mounted on each ring with respect to said shaft, each coil comprising a plurality of coil sectors;
(d) a plurality of permanently magnetized ring members each having two symmetrical polarized regions on each face portion thereof;
(e) means for rotatably mounting a pair of permanently magnetized members coaxially on said shaft on opposite sides of each magnetic ring and with like polarized regions arranged face to face, for providing similar magnetic fields between each of said rings and each corresponding pair of said permanently magnetized ring members;
(f) a power source for providing unidirectional current at a predetermined magnitude;
(g) a commutator for simultaneously connecting said power source to each coil, said commutator including a plurality of segments mounted on said shaft and connected to the end windings of two adjacent coil sectors of each coil, and a pair of brushes arranged in diametric opposition with respect to said shaft axis for contact with said segments, whereby unidirectional current flows through the windings of each coil in both directions away from a segment in contact with one brush to a segment in contact with the other brush;
(h) mounting means for rotatably mounting said brushes; and
(i) means for rotating said mounting means at a predetermined speed;
(j) said current flow in said windings providing coil fluxes which interact with said similar magnetic fields to impart rotational motion to said permanently magnetized ring members at said predetermined speed.

11. An electromagnetic device comprising:
(a) a stationary shaft;
(b) a magnetic ring mounted coaxially on said shaft;
(c) a toroidal coil symmetrically mounted on said ring with respect to said shaft, and comprising a plurality of coil sectors having a predetermined number of windings;
(d) a pair of permanently magnetized ring members each having two symmetrical polarized regions on each face portion thereof;
(e) means for rotatably mounting said permanently magnetized ring members coaxially on said shaft on opposite sides of said magnetic ring and with like polarized regions arranged face to face for providing similar magnetic fields between said ring and said pair of permanently magnetized ring members;
(f) a power source for providing unidirectional current at a predetermined magnitude;
(g) a terminal connected to each junction point between adjacent coils sectors; and
(h) means for selectively connecting said source to diametrically opposed terminals whereby unidirectional current flows through the windings in both directions away from one terminal, said current flow providing coil flux which interacts with said similar magnetic fields to impart rotational force to said permanently magnetized rings until a position is reached at which the flux interaction provides equal and opposite forces, said position corresponding to the selected pair of terminals.

References Cited
UNITED STATES PATENTS

| | | | |
|---|---|---|---|
| 510,367 | 12/1893 | Roe | 310—27 |
| 1,223,449 | 4/1917 | Turbayne | 310—267 X |
| 2,916,684 | 12/1959 | Schneider | 318—325 |
| 3,161,793 | 12/1964 | Laithwaite | 310—27 |
| 3,315,106 | 4/1967 | Reynst | 310—268 |

DAVID X. SLINEY, *Primary Examiner.*

U.S. Cl. X.R.
310—27, 268